(12) United States Patent
Derbeko et al.

(10) Patent No.: US 10,152,242 B1
(45) Date of Patent: *Dec. 11, 2018

(54) HOST BASED HINTS

(71) Applicant: EMC IP Holding Company LLC, Hopkinton, MA (US)

(72) Inventors: Philip Derbeko, Modiin (IL); Marik Marshak, Newton, MA (US); Anat Eyal, Tel Aviv (IL); Arieh Don, Newton, MA (US); Alexandr Veprinsky, Brookline, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/744,617

(22) Filed: Jun. 19, 2015

Related U.S. Application Data

(63) Continuation of application No. 13/727,677, filed on Dec. 27, 2012, now Pat. No. 9,063,861.

(51) Int. Cl.
*G06F 12/08* (2016.01)
*G06F 3/06* (2006.01)
*G06F 12/0868* (2016.01)
*G06F 12/0862* (2016.01)

(52) U.S. Cl.
CPC .......... *G06F 3/0613* (2013.01); *G06F 3/0665* (2013.01); *G06F 3/0689* (2013.01); *G06F 12/0862* (2013.01); *G06F 12/0868* (2013.01); *G06F 2003/0692* (2013.01); *G06F 2212/604* (2013.01)

(58) Field of Classification Search
None
See application file for complete search history.

(56) References Cited

U.S. PATENT DOCUMENTS

| | | | |
|---|---|---|---|
| 7,543,109 B1 * | 6/2009 | Bell, Jr. | G06F 12/0888 711/113 |
| 8,239,584 B1 | 8/2012 | Rabe et al. | |
| 8,381,213 B1 * | 2/2013 | Naamad | G06F 12/0862 718/100 |
| 8,539,038 B2 | 9/2013 | Jones et al. | |
| 8,595,463 B2 | 11/2013 | Tremaine et al. | |
| 8,775,775 B1 * | 7/2014 | Ekambaram | G06F 12/0862 707/674 |
| 8,825,724 B2 * | 9/2014 | Mitra | G06F 17/30132 707/607 |
| 9,063,861 B1 | 6/2015 | Derbeko et al. | |
| 2003/0088740 A1 * | 5/2003 | Henry | G06F 9/30047 711/137 |

(Continued)

OTHER PUBLICATIONS

Liu et al., "CLIC: CLient-Informed Caching for Storage Servers;" FAST '09: 7$^{th}$ USENIX Conference on File and Storage Technologies; Jan. 2009; pp. 297-310; 14 Pages.

(Continued)

*Primary Examiner* — Kaushikkumar M Patel
(74) *Attorney, Agent, or Firm* — Krishnendu Gupta; Jason Reyes; Robert Kevin Perkins

(57) ABSTRACT

A method system and program product for sending a hint from the server to the storage array, the hint relating access requests of data stored on the storage array, receiving the hint at the storage array, and updating information about the data stored on the storage array using the hint.

17 Claims, 11 Drawing Sheets

(56) References Cited

U.S. PATENT DOCUMENTS

| | | | | |
|---|---|---|---|---|
| 2003/0126232 | A1* | 7/2003 | Mogul | G06F 17/30902 709/219 |
| 2004/0064577 | A1* | 4/2004 | Dahlin | H04L 29/06 709/235 |
| 2008/0028147 | A1* | 1/2008 | Jacobson | G06F 12/0862 711/118 |
| 2008/0244080 | A1* | 10/2008 | James | G06F 9/383 709/231 |
| 2008/0256294 | A1* | 10/2008 | Gill | G06F 12/0897 711/117 |
| 2008/0263259 | A1* | 10/2008 | Sadovsky | G06F 3/0613 711/100 |
| 2012/0042123 | A1* | 2/2012 | Kolovson | G06F 12/0804 711/113 |
| 2012/0084516 | A1* | 4/2012 | Iwuchukwu | H04L 67/2847 711/144 |
| 2013/0031298 | A1* | 1/2013 | Tan | G06F 12/0246 711/103 |
| 2013/0041937 | A1* | 2/2013 | Zhu | H04L 67/322 709/203 |
| 2013/0290598 | A1 | 10/2013 | Fiske et al. | |

OTHER PUBLICATIONS

Yalamanchili et al., "DHIS: Discriminating Hierarchical Storage;" Proceedings of the Israeli Experimental Systems Conference (ACM SYSTOR '09); May 4-6, 2009; 12 Pages.

U.S. Non-Final Office Action dated Dec. 15, 2014 for U.S. Appl. No. 13/727,677; 8 Pages.

Response to U.S. Non-Final Office Action dated Dec. 15, 2014 for U.S. Appl. No. 13/727,677; Response Filed on Dec. 30, 2014; 9 Pages.

Response to U.S. Notice of Non-Compliant Amendment dated Jan. 12, 2015 for U.S. Appl. No. 13/727,677; Response Filed on Feb. 3, 2015; 7 Pages.

U.S. Notice of Allowance dated Feb. 24, 2015 for U.S. Appl. No. 13/727,677; 5 Pages.

\* cited by examiner

HOST BASED HINTS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

A traditional storage array (herein also referred to as a "disk storage array," "disk array," "data array," or simply "array") is a collection of hard disk drives operating together logically as a unified storage device. Storage arrays are designed to store large quantities of data. Storage arrays typically include one or more storage array processors (SPs), for handling both requests for allocation and input/output (I/O) requests. An SP is the controller for and primary interface to the storage array.

Performance of a storage array may be characterized by the array's total capacity, response time, and throughput. The capacity of a storage array is the maximum total amount of data that can be stored on the array. The response time of an array is the amount of time that it takes to read data from or write data to the array. The throughput of an array is a measure of the amount of data that can be transferred into or out of (i.e., written to or read from) the array over a given period of time.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed (in case of spinning media), serial versus parallel access to multiple read/write heads, and the size of data transfer buffers.

One factor that may limit the performance of a storage array is the performance of each individual storage component. For example, the read access time of a disk storage array is constrained by the access time of the disk drive from which the data is being read. Read access time may be affected by physical characteristics of the disk drive, such as the number of revolutions per minute of the spindle: the faster the spin, the less time it takes for the sector being read to come around to the read/write head. The placement of the data on the platter also affects access time, because it takes time for the arm to move to, detect, and properly orient itself over the proper track (or cylinder, for multihead/multiplatter drives). Reducing the read/write arm swing reduces the access time. Finally, the type of drive interface may have a significant impact on overall disk array storage. For example, a multihead drive that supports reads or writes on all heads in parallel will have a much greater throughput than a multihead drive that allows only one head at a time to read or write data.

Furthermore, even if a disk storage array uses the fastest disks available, the performance of the array may be unnecessarily limited if only one of those disks may be accessed at a time. In other words, performance of a storage array, whether it is an array of disks, tapes, flash drives, or other storage entities, may also be limited by system constraints, such the number of data transfer buses available in the system and the density of traffic on each bus.

The use of solid-state storage devices is increasing in popularity as solid-state memory has advanced to the point where cost and density of memory is such that organizations can afford to operate with systems that store and process terabytes of data. A solid state storage device is a content storage device that uses solid-state memory to store persistent content. A solid-state storage device may emulate (and therefore replace) a conventional hard disk drive. Additionally/alternatively, a solid state storage device may be used within a cache memory system. With no moving parts, a solid-state storage device largely eliminates (or greatly reduces) seek time, latency and other electromechanical delays and failures associated with a conventional hard disk drive.

SUMMARY

A method system and program product for sending a hint from the server to the storage array; wherein the hint relates access requests of data stored on the storage array, receiving the hint at the storage array, and updating information about the data stored on the storage array using the hint.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
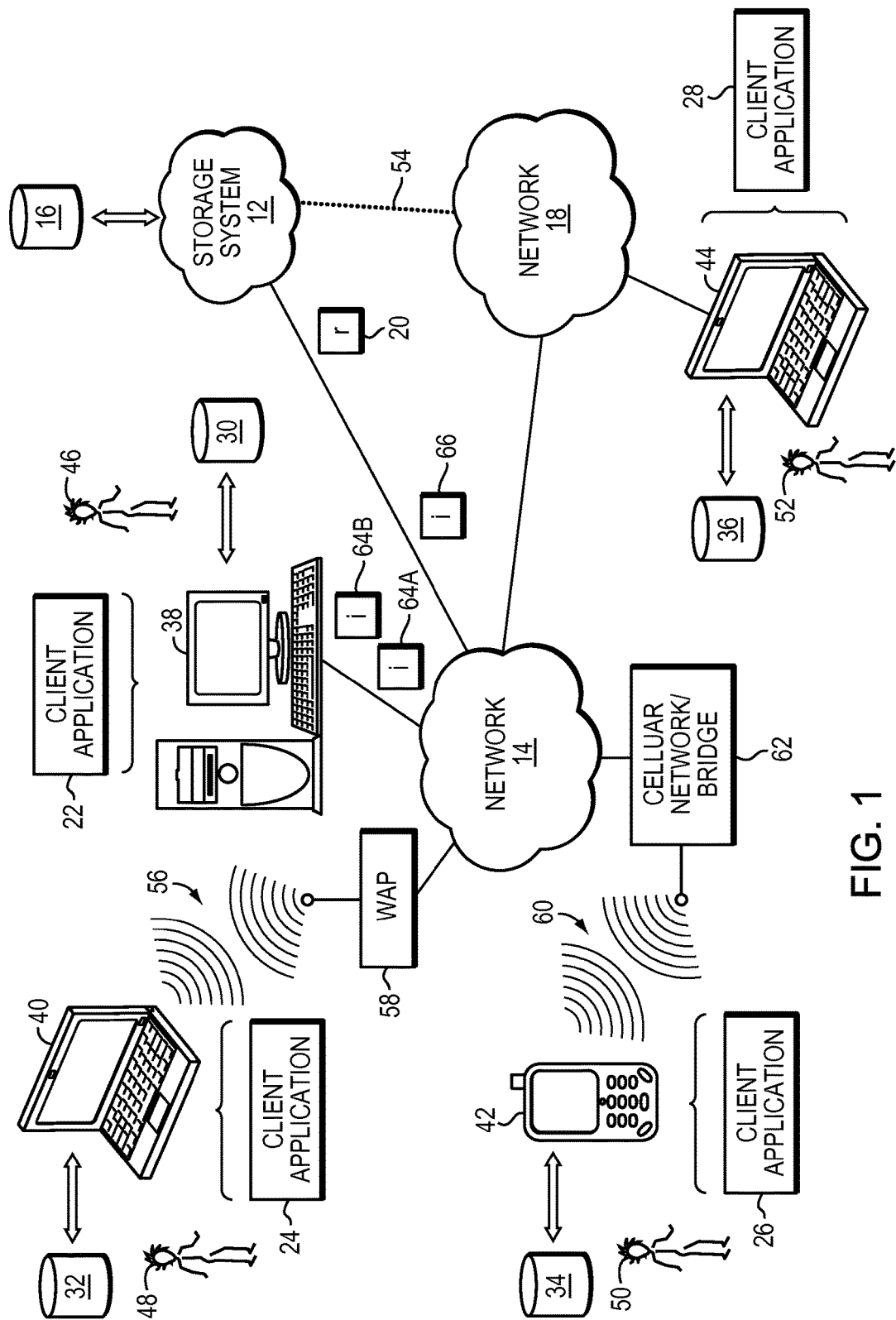
FIG. 1 is a simplified illustration of an environment with a data storage system, in accordance with an embodiment of the present disclosure.

In some embodiments, the current disclosure may enable monitoring data requests made by one or more applications being executed on a host or server to generate a prediction concerning a quantity of data that may be needed by the one or more applications in the future. In certain embodiments, some of the quantity of data may be stored within a backend cache system included within a data array coupled to the host. In certain embodiments, a host or server connected to a data array may have a cache. In some of these embodiments, some of the quantity of data may be stored in the host or server cache. In further embodiments, the current disclosure may enable communication and coordination between the cache on the server or host and the cache on the data storage array. In at least one embodiment, the communication may include sending one or more hints of the data access on the host or server cache to the storage array.

In some embodiments, the front end cache system may be a flash-based front end cache system. In most embodiments, a quantity of data of the data array may be stored within a frontend cache system included within the host. In other embodiments, a data array may include a plurality of electro-mechanical storage devices. In further embodiments, a quantity of data may be retrieved from the plurality of electro-mechanical storage devices. In at least some embodiments, the backend cache system may be a flash-based backend cache system. In most embodiments, the host may be configured as an application server. In further embodiments, information about data access requests serviced by the host based cache may be shared with the storage array to generate an overall understanding of data access requests.

Historically, large storage arrays today manage many disks which have been identical. However it is possible to use different types of disks and group the like kinds of disks into Tiers based on the performance characteristics of the disks. A group of fast but small disks may be a fast Tier. As well, a group of solid state drives could be another fast Tier. A group of slow but large disks may be a slow Tier. It may be possible to have other Tiers with other properties or constructed from a mix of other disks to achieve a performance or price goal. Storing often referenced, or hot, data on the fast Tier and less often referenced, or cold, data on the slow tier may create a more favorable customer cost profile than storing all data on a single kind of disk.

In addition to a storage tier, there may be a construct referred to as a storage pool. A storage pool ("pool"), as in the case of a group of storage tiers, may be made up of devices with different performance and cost characteristics. As in the case of storage tiers, it may be advantageous to locate the hot or most accessed data to the devices within the storage pool with the best performance characteristics while storing the cold, i.e. least accessed data, on the devices that have slower performance characteristics. This can lead to a lower cost system having both faster and slower devices that can emulate the performance of a more expensive system having only faster storage devices.

Early approaches have either required the customer to only use a single kind of disk or had the customer manage different tiers of disk by designing which data should be stored on which tier when the data storage definitions are created. Typically, having customers manually manage tiers or pools of storage requires the customer to do a lot of work to categorize their data and to create the storage definitions for where the different categories of storage should be put. Previous approaches required not only categorizing the data and manually placing the data on different tiers or pools, but also keeping the data classification up to date on an ongoing basis to react to changes in customer needs. Conventionally, storage of the data has also been expanded through the use of a cache. Generally, this has led to a problem of how to determine what data to store in the cache or on what storage tier.

In certain embodiments, the current techniques may track the "temperature" of data. In general, temperature corresponds to how often and how recently the data has been accessed. In general, hot data refers to data that has been accessed often and recently. In general, cold data refers to data that has not been accessed recently or often. Usually, hot data may be stored on a faster storage tier and cold data may be migrated to a slower storage tier. In certain embodiments, the current techniques may enable data migration between storage tiers based on access requests to the data on the data storage system.

Co-owned application Ser. Nos. 12/494,622, 12/640,244, 12/639,469 and 12/640,244, titled "FACILITATING DATA MIGRATION BETWEEN TIERS," "AUTOMATED DATA RELOCATION AMONG STORAGE TIERS BASED ON STORAGE LOAD," "LOGICAL UNIT MIGRATION ASSISTANT FOR HARDWARE-BASED STORAGE TIERING," and "AUTOMATED DATA RELOCATION AMONG STORAGE TIERS BASED ON STORAGE LOAD," respectively, provide a description of Fully Automated Storage Tiering (FAST) and are hereby incorporated by reference.

Typically, if a server or host has a cache, data from the data array or storage array may be stored on the server cache. Generally, a data array or storage array may keep performance data on data access requests to data on the storage array. Usually, the data array or storage array may use the performance data to determine what data to store in a cache on the data array or storage array. However, conventional systems may not keep performance information on the data access requests to the cache on the server or host.

Further, if performance information about data requests serviced by a host based cache were kept on the cache on the host or server, the information about the data requests to the cache on the server or host may not generally be shared with the data or storage array. Conventionally, this may lead to the data access information on the storage array not taking into account data access requests on the server cache. Usually, this may lead to the storage array moving information accessed often on the server or host but rarely accessed on the storage array to lower tiered storage. Conventionally, this may occur as the data or storage array believes the data to be cold or less warm based on the access requests arriving at the storage array as the data access requests are handles at the server or host cache.

Generally, in systems with automated tiering or shifting of the data based on access requests, the array may place some of the application data (that is cached in the host caching system) in a lower tier because it will think that data is cold, or just warm. Conventionally, this may be because the host does not share data requests serviced with the host based cache with the storage array. Usually, moving this data may have an impact on the application because some of the IO (like writes) will be service by a lower tier, and the writes may have impact on the application due to dependency of the read on the writes.

Conventionally, each host cache system may be limited in the amount of its cache for reads. Typically, in case of a busy host that service many read operation that can not fit in the host cache system. Usually, the data may be thrown out of the host cache, which usually results in the read being forwarded and serviced by the storage array; resulting in a big performance hit. Conventionally, this may occur as an automated multi tier system (like FAST VP) may demote application data to SATA (or another tier) because the data looked cold due to lack of knowledge of usage on the host cache.

In certain embodiments, the current disclosure may enable hints to be sent from the server or host to the storage array. In some embodiments, these hints may contain information about the storage requests that are serviced by the cache on the host or server. In most embodiments, the hints from the server may be combined with the information on the storage array to arrive at a cumulative picture of the requests for data. In at least some embodiments, the information from the server may be used to "heat" up or move the data on the storage array to keep the data on a faster storage tier.

In further embodiments, the hints may enable preposition of the data in the array for future workload not seen by the storage system. In a particular embodiment, a cache on a server or host may eject data from the host cache, it may send a hint to the storage array to have the array to preheat the application data and promote it to higher tier.

In certain embodiments, the current disclosure may enable communication to enable the storage array to heat data that would otherwise be demoted as cold data. In a particular embodiment, a hint may enable a storage array to not demote the application's hot data from a higher tier to a lower tier. In this embodiment, if an application has a workload of 99% read and 1% write (where reads are serviced by the host based cache) the storage array may not see the reads or writes. In this embodiment, the host may communicate a hint to the storage array so that the storage array does not demote the application data to a lower tier based on inactivity. In this embodiment, this may enable the storage array to better service writes as the application data will be stored on a faster tier. In this embodiment, if the hint had not occurred, there may have been a negative impact on the application because the write operation will take long time as the data was stored on a lower tier.

In further embodiments, the current disclosure may enable communication from the host cache to the storage array to indicate that data is to be kept in the host cache. In these embodiments, the storage array may demote the data being kept in the storage array without impacting read a writes on the host. In further embodiments, if the host based cache is going to remove the data from the host based cache, a hint may be sent to the storage array to heat the data and promote it from a lower to a faster storage tier.

Co-owned application Ser. Nos. 12/494,622, 12/640,244, 12/639,469 and 12/640,244, 12/827,092 entitled METHOD FOR DYNAMIC MANAGEMENT OF SYSTEM RESOURCES THROUGH APPLICATION HINTS filed 30 Jun. 2010, Ser. No. 12/751,093 entitled STORAGE INTEGRATION PLUGIN FOR VIRTUAL SERVERS filed 31 Mar. 2010, Ser. No. 13/525,816 entitled TECHNIQUES FOR PROVIDING STORAGE HINTS FOR USE IN CONNECTION WITH DATA MOVEMENT OPTIMIZATIONS filed 18 Jun. 2012, and Ser. No. 13/596,570 entitled PRIORITIZING BUSINESS PROCESSES USING HINTS FOR A STORAGE SYSTEM filed 28 Aug. 2012, provide a further description of hints and hinting and are hereby incorporated by reference.

In certain embodiments, in a multi tiering Virtual provision system, an application may be allowed to used multiple tiers of storage (SATA, Fiber Channel (FC), EFD). In certain embodiment, a system may collects analytical data (workload pattern) on the storage device in a fine granular fashion, such as sub-LUN, in order to decide about the optimal data placement of the application data to achieve best performance based on customer policies. In some embodiments, with a federated system in the data center, the hosts in the data center may deploy host based cache system (for example EMC's VFcache system) that deploy sophisticated algorithm in order to cache data on the host to improve the application performance.

In certain embodiments, a system on the host may collect, internally, work load profiles (patterns, also called analytics), and may send some or all of the information collected in-band or out-of-band to the storage array using public industry protocols such as like SCSI (using the log page), or propriety protocols. In at least some embodiments, a system on the storage array may act on those hints/profiles to place the application data across tiers in optimal fashion for existing workload or future workload (preheat) to be serviced by the array. In most embodiments, cooperation with host base system may be advantageous as host caches change data access pattern may not otherwise be seen by a storage system. In further embodiments, a frequently accessed data in cache may not get enough hits in storage system and be moved to a slower tier. In certain embodiments, a host cache may act as an extension of storage system.

In other embodiments, the quantity of data may be stored within a front end cache system included within the host. In certain embodiments, the front end cache system may be a flash-based front end cache system. In at least some embodiments, the data array may include a plurality of electro-mechanical storage devices. In further embodiments, the quantity of data may be retrieved from a plurality of electro-mechanical storage devices. In most embodiments, the back-end cache system may be a flash-based backend cache system. In some embodiments, the host may be configured as an application server.

In an embodiment, a computer program product may reside on a computer readable medium that has a plurality of instructions stored on it. In some embodiment, when executed by a processor, the instructions may enable the processor to perform operations including monitoring data requests made by an application being executed on a host to generate a prediction concerning a quantity of data that may be needed by the application in the future. In further embodiment, the quantity of data may be stored within a backend cache system included within a data array coupled to the host. In most embodiments, the quantity of data may be provided to the host. In further embodiments, the backend cache system may be a flash-based backend cache system. In at least one embodiment, the host may be configured as an application server.

In some embodiments, a computing system may include at least one processor and at least one memory architecture coupled with the at least one processor, wherein the computing system may be configured to perform operations including monitoring data requests made by an application being executed on a host to generate a prediction concerning a quantity of data that may be needed by the application in the future. In certain embodiments, a quantity of data may be stored within a backend cache system included within a data array coupled to the host. In at least some embodiments, a quantity of data is provided to the host.

Referring to the example embodiment of FIG. 1. In the example embodiment of FIG. 1, there is a storage system, which may be but is not limited to being: a Network Attached Storage (NAS) system, a Storage Area Network (SAN), a personal computer with a memory system, a server computer with a memory system, and a cloud-based device with a memory system.

In the example embodiment of FIG. 1, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™, Unix, or a custom operating system, for example.

Network 14 may be connected to one or more secondary networks (e.g., network 18), examples of which may include but are not limited to: a local area network; a wide area network; or an intranet, for example. Various data requests (e.g. data request 20) may be sent from client applications 22, 24, 26, 28 to storage system 12. Examples of data request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Client electronic devices 38, 40, 42, 44 may each execute an operating system, examples of which may include but are not limited to Microsoft Windows™, Microsoft Windows CE™, Redhat Linux™, or a custom operating system. Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

For the following discussion, client application 22 is going to be described for illustrative purposes. However, this is not intended to be a limitation of this disclosure, as other client applications (e.g., client applications 24, 26, 28) may be equally utilized.

For illustrative purposes, storage system 12 will be described as being a network-based storage system that includes a plurality of rotating, electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
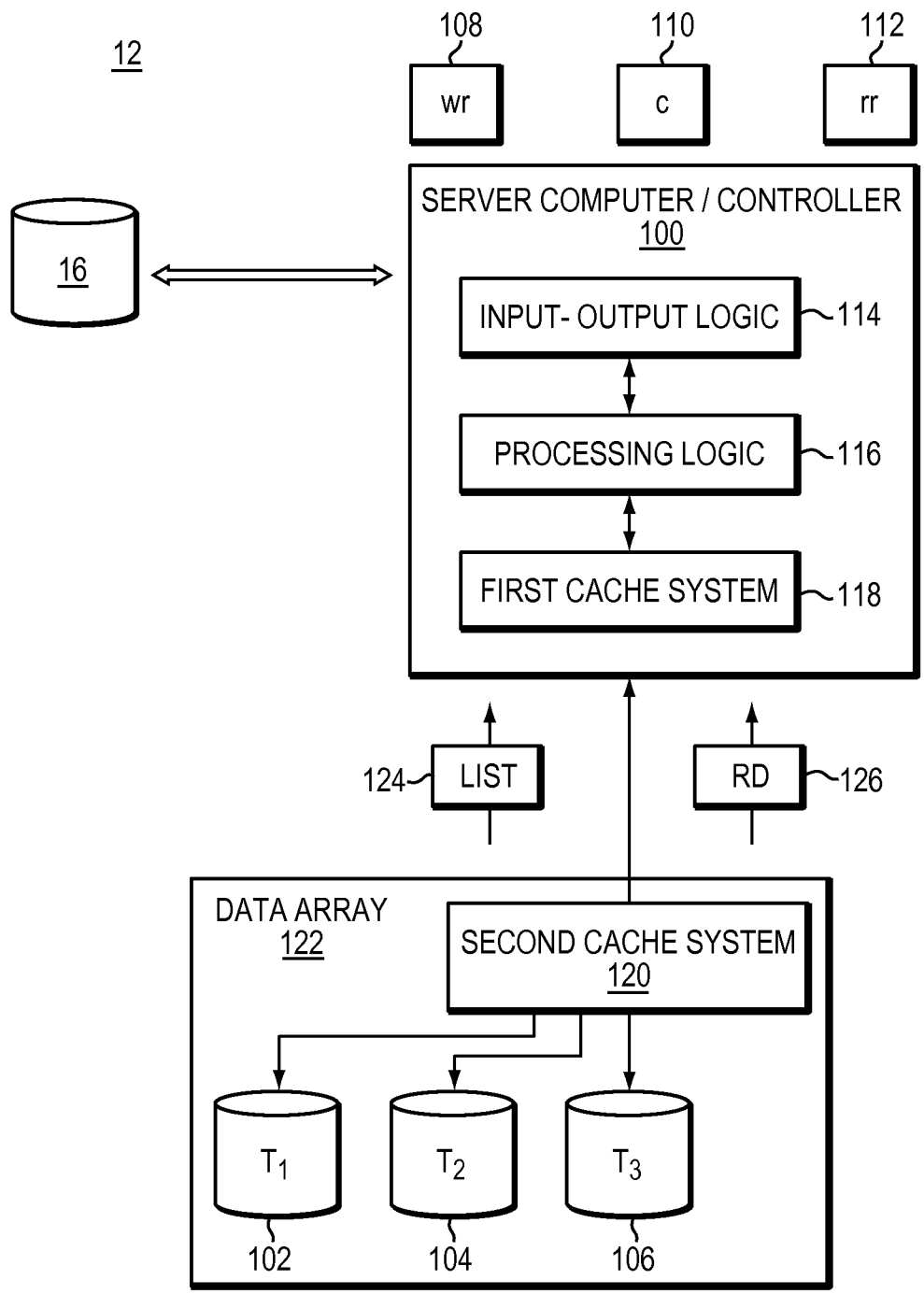
FIG. 2 is a simplified illustration of a data storage system with a cache and a server with a cache, in accordance with an embodiment of the present disclosure.

Referring also to the example embodiment of FIG. 2, storage system 12 may include a server computer/controller (e.g. server computer/controller 100), and a plurality of data tiers $T_{1-n}$ (e.g. data tiers 102, 104, 106). Data tiers 102, 104, 106 may be configured to provide various levels of performance. For example, one or more of data tiers 102, 104, 106 may be configured to be a lower performance data tier and one or more of data tiers 102, 104, 106 may be configured to be a higher performance data tier.

For example, data tier 102 may be configured as a higher performance data tier and may include one or more flash storage devices. Data tier 104 may be configured as a medium performance data tier and may include one or more fiber channel storage devices. And data tier 104 may be configured as a lower performance data tier and may include one or more lower performance storage devices (e.g., SATA drives, SCSI drives, SAS drives, IDE drives, and EIDE drives).

One or more of data tiers 102, 104, 106 may be configured to provide various levels of performance and/or high availability. For example, one or more of data tiers 102, 104, 106 may be configured as a RAID 0 array, in which data is striped across multiple drives. By striping data across multiple drives, improved performance may be realized. However, RAID 0 arrays do not provide a level of high availability. Accordingly, one or more of data tiers 102, 104, 106 may be configured as a RAID 1 array, in which data is mirrored between multiple drives. By mirroring data between multiple drives, a level of high availability is achieved as multiple copies of the data are stored within storage system 12.

While data tiers 102, 104, 106 are discussed above as possibly being configured in a RAID 0 or RAID 1 array, this is for illustrative purposes only and is not intended to be a limitation of this disclosure, as other configurations are possible. For example, data tiers 102, 104, 106 may be configured in a non-RAID fashion or as a RAID 3, RAID 4, RAID 5 or RAID 6 array.

While in this particular example, storage system 12 is shown to include three data tiers (e.g. data tiers 102, 104, 106), this is for illustrative purposes only and is not intended to be a limitation of this disclosure. Specifically, the actual number of data tiers may be increased or decreased depending upon system needs.

As discussed above, data tiers 102, 104, 106 may include one or more one or more flash storage devices, fiber channel storage devices, and lower performance storage devices (e.g., SATA drives, SCSI drives, SAS drives, IDE drives, and EIDE drives). Storage device 16 may include but is not limited to: a hard disk drive; a tape drive; an optical drive; a RAID device; a random access memory (RAM); a read-only memory (ROM); and all forms of flash memory storage devices.

As discussed above, various data requests (e.g. data request 20) may be generated. For example, these data requests may be sent from client applications 22, 24, 26, 28 to storage system 12. Additionally/alternatively and when server computer/controller 100 is configured as an application server, these data requests may be internally generated within server computer/controller 100. Examples of data request 20 may include but are not limited to data write request 108 (i.e. a request that content 110 be written to storage system 12) and data read request 112 (i.e. a request that content 110 be read from storage system 12).

Server computer/controller 100 may include input-output logic 114 (e.g., a network interface card or a Host Bus Adaptor (HBA)), processing logic 116, and first cache system 118. Examples of first cache system 118 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 110 to be written to storage system 12 may be received by input-output logic 114 (e.g. from network 14 and/or network 18) and processed by processing logic 116. Additionally/alternatively and when server computer/controller 100 is configured as an application server, content 110 to be written to storage system 12 may be internally generated by server computer/controller 100. As will be discussed below in greater detail, processing logic 116 may initially store content 110 within first cache system 118.

Depending on the manner in which first cache system 118 is configured, processing logic 116 may immediately write content 110 to second cache system 120/data tiers 102, 104, 106 (if first cache system 118 is configured as a write-through cache) or may subsequently write content 110 to second cache system 120/data tiers 102, 104, 106 (if first cache system 118 is configured as a write-back cache). Examples of second cache system 120 (i.e., a backend cache system) may include but are not limited to a volatile, solid-state, cache memory system (e.g., a dynamic RAM cache memory system) and/or a non-volatile, solid-state, cache memory system (e.g., a flash-based, cache memory system).

The combination of second cache system 120 and data tiers 102, 104, 106 may form data array 122, wherein first cache system 118 may be sized so that the number of times that data array 122 is accessed may be reduced. Accordingly, by sizing first cache system 118 so that first cache system 118 retains a quantity of data sufficient to satisfy a significant quantity of data requests (e.g., data request 20), the overall performance of storage system 12 may be enhanced.

Further, second cache system 120 within data array 122 may be sized so that the number of times that data tiers 102, 104, 106 are accessed may be reduced. Accordingly, by sizing second cache system 120 so that second cache system 120 retains a quantity of data sufficient to satisfy a significant quantity of data requests (e.g., data request 20), the overall performance of storage system 12 may be enhanced.

As discussed above, the instruction sets and subroutines of one or processes may be stored on storage device 16 included within storage system 12, may be executed by one or more processors (not shown) and one or more memory architectures included within storage system 12. Accordingly, in addition to being executed on server computer/controller 100, some or all of instruction sets or subroutines may be executed by one or more processors (not shown) and one or more memory architectures included within data array 122.

As discussed above, data tiers 102, 104, 106 may be configured to provide various levels of performance, wherein one or more of data tiers 102, 104, 106 may be configured to be a lower performance data tier and one or more of data tiers 102, 104, 106 may be configured to be a higher performance data tier.

Accordingly, data tier 102 may be configured as a higher performance data tier and may include one or more flash storage devices. Data tier 104 may be configured as a medium performance data tier and may include one or more fiber channel storage devices. And data tier 106 may be configured as a lower performance data tier and may include one or more lower performance storage devices (e.g., SATA drives, SCSI drives, SAS drives, IDE drives, and EIDE drives).

Figure 3:
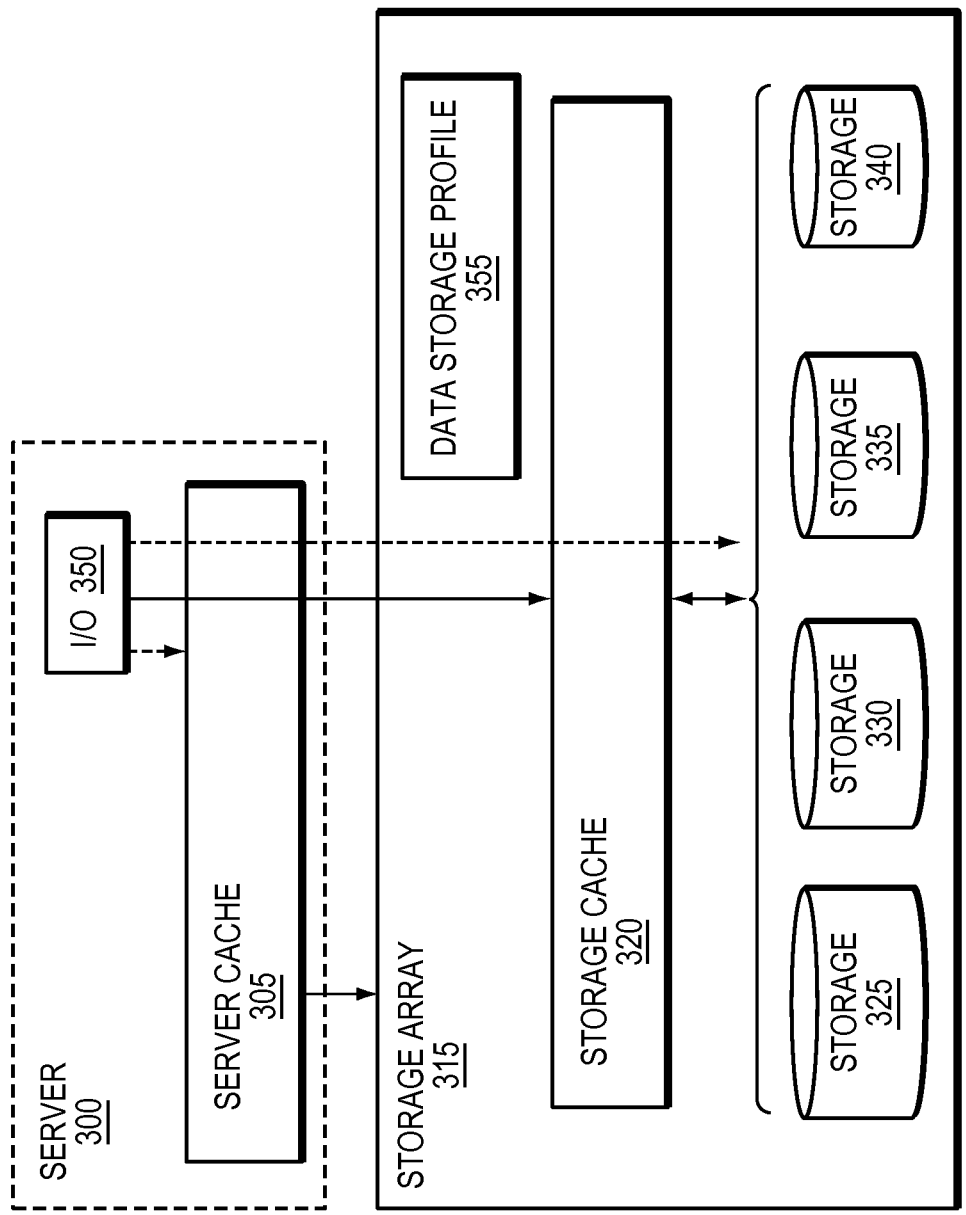
FIG. 3 is a simplified illustration of a data storage system with a cache and a data storage profile, and a server with a cache, in accordance with an embodiment of the present disclosure.

Refer now to the example embodiment of FIG. 3, which illustrates a simplified example of a server, with cache, and a data storage system with a cache and storage tiers. In the example embodiment of FIG. 3, server 300 has server cache 305. Server cache 305 may be a flash card. Server 300 communicates with storage array 315. Storage array 315 has storage cache 320 and tiered storage mediums 325, 330, 335, and 340. Each storage medium of tired storage mediums 325, 330, 335, and 340 may have different performance characteristics. IO 350 from server 300 may be serviced by either server cache 305, storage cache 320, or from one medium of storage mediums 325, 330, 335, and 340. An IO serviced from server cache may result in the lowest latency as the server cache has the lowest latency. A miss in the server cache may be then served quickest in storage cache 320. If the data requested by IO 350 Is not in the storage cache, then the IO would be serviced by one of the storage mediums 325, 330, 335, and 340. In turn, each storage medium of storage mediums 325, 330, 335, and 340 may have different performance characteristics with Storage medium 325 being the largest but slowest storage medium and storage 340 may be the smallest but quickest storage medium outside of storage cache 320.

In the example embodiment of FIG. 3, storage array 315 tracks the IO requests from server 300 to build a profile of IO requests. Storage array 315 then uses this information to build a profile 355 of the data requests to storage array 315. Storage array 315 uses this data request profile to determine what data should be store in storage cache 320, and what data should be stored on each of the respective storage mediums 325, 330, 335, and 340. However, storage array 315 does not have visibility to the IOs not sent to it by server 300 serviced by cache 305. This may create a situation where Storage array does not have a complete picture of the IOs and incorrectly stores data base on an incomplete access profile.

Figure 4:
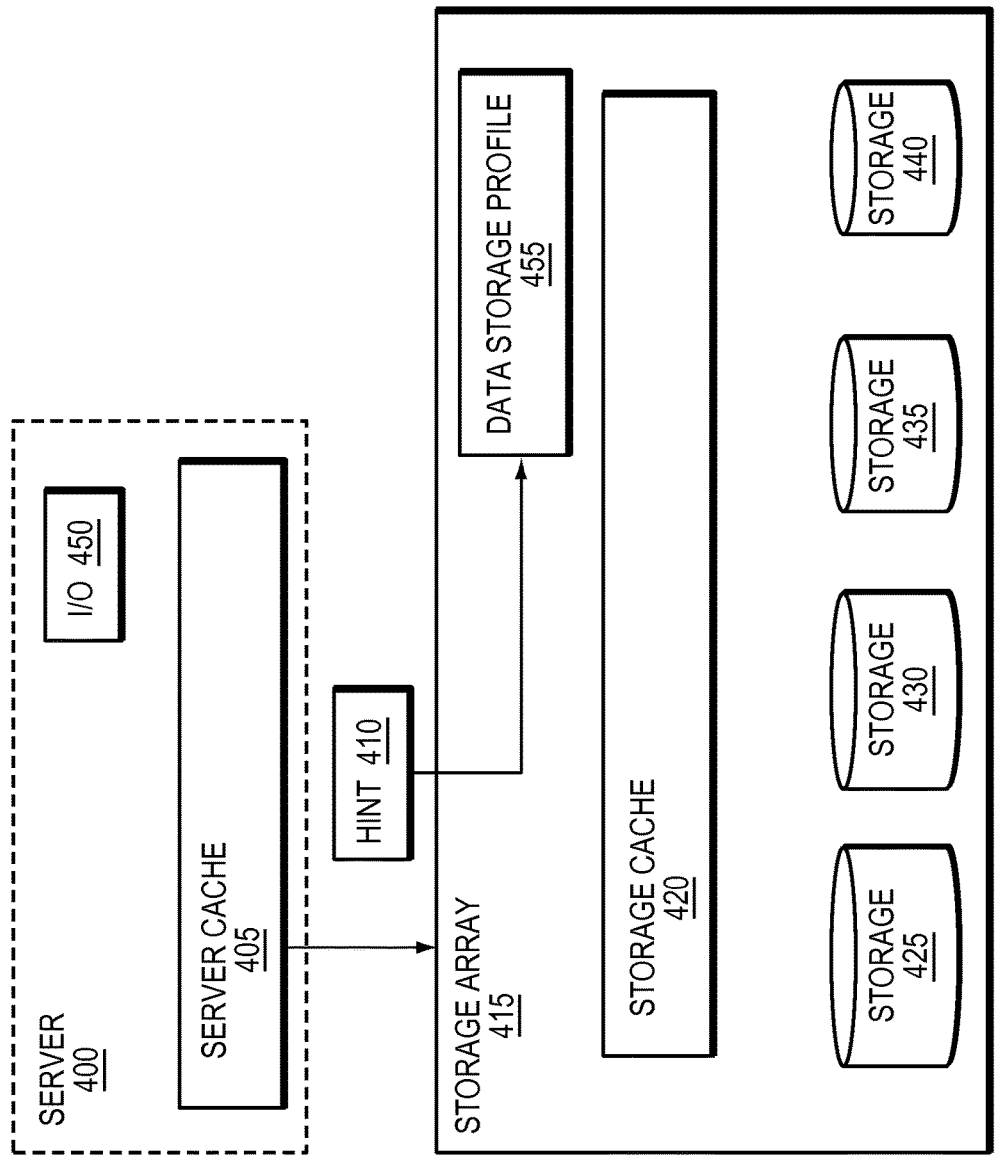
FIG. 4 is a simplified illustration of a data storage system with a cache and a data storage profile, and a server with a cache sending a hint to a data storage system, in accordance with an embodiment of the present disclosure.
Figure 5:
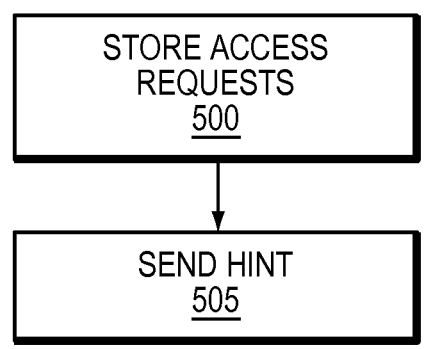
FIG. 5 is a simplified example of a method for recording storage access requests and sending a hint to a data storage system, in accordance with an embodiment of the present disclosure.

Refer now to the example embodiments of FIGS. 4 and 5. In the example embodiment of FIGS. 4 and 5, Server stores access requests (step 500). Server 400 sends storage array 415 a hint based on the IO requests serviced by server cache 405 (step 505). Storage array 415 receives hint 410. Storage array 415 uses hint 415 to manage the location of data on the storage array 415.

In some embodiments, the hint may be combined with data storage profile information. In other embodiments, the hint may be used to heat up data on the storage array, which may cause the data to be moved across tiers. In some embodiments, the hint may enable data to be moved into the storage cache 420 from other tiers. In further embodiments, the hint may enable data to be moved from the storage cache into storage.

Figure 6:
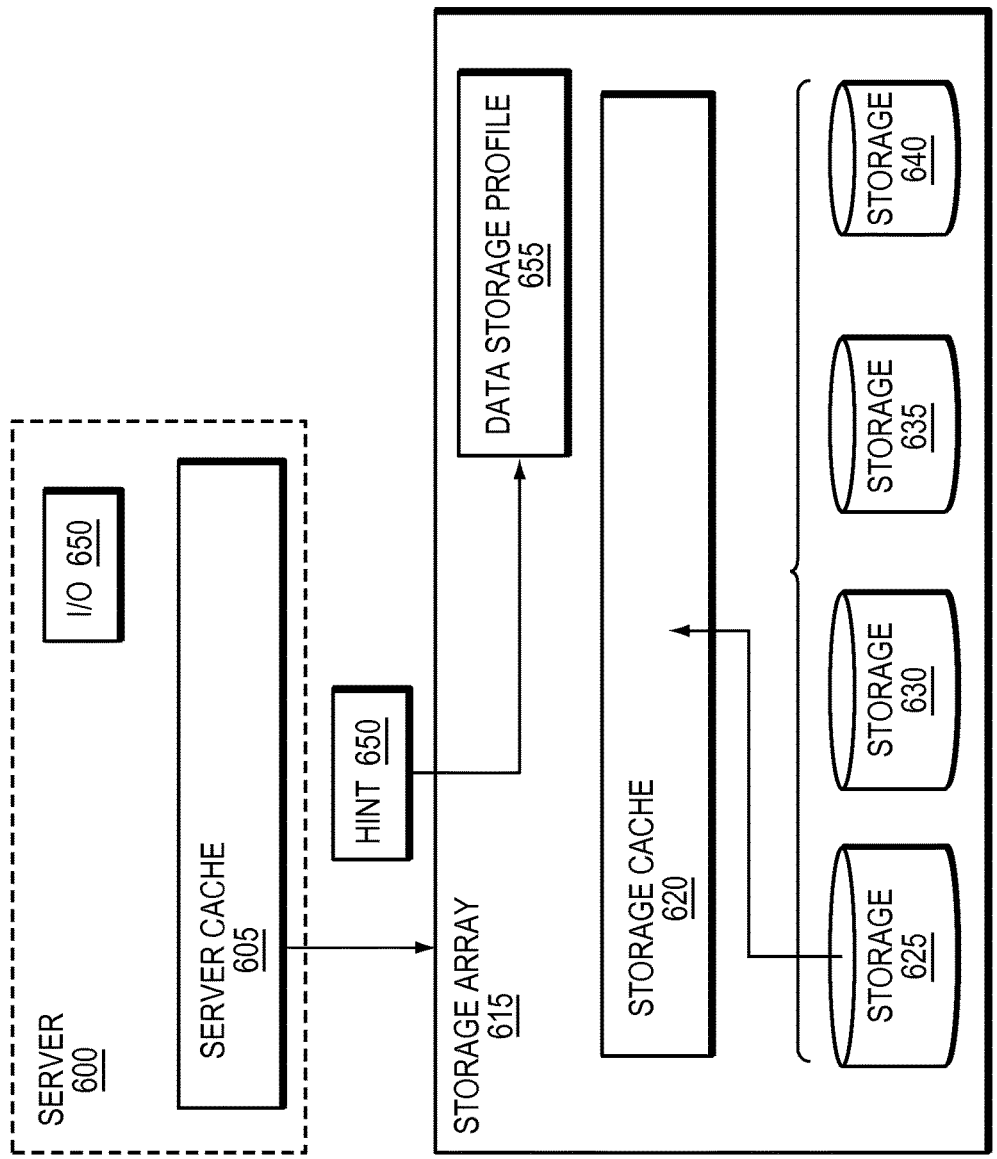
FIG. 6 is a simplified illustration of a server sending a hint to a data storage system, where the hint includes data about moving information into a storage cache of the data storage system, in accordance with an embodiment of the present disclosure.
Figure 7:
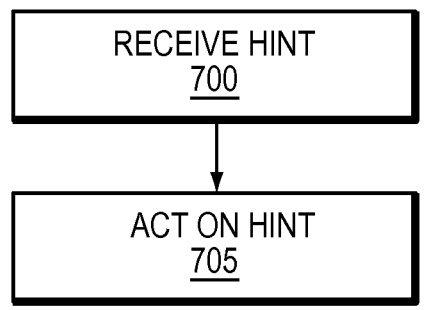
FIG. 7 is a simplified example of a method for receiving and acting on a hint, in accordance with an embodiment of the present disclosure.

Refer now to the example embodiment of FIGS. 6 and 7. Storage array 615 receives hint 650 (step 700). Storage array 615 acts on hint 650 (step 705). In the embodiments of FIGS. 6 and 7, storage array may combine the information in hint 650 with data storage profile 655 to decide to move data from storage 625, a slow storage tier to storage cache 620. In these embodiments, server cache 605 may have decided to eject data from cache 605 on server 600 and the combined data profile of the server and storage array may indicate that the data should be moved into storage array cache 620 from storage 625. In some embodiments, a previous hint may have indicated that this data could be moved to storage 625 as a copy of the data was being kept in server cache 605.

Figure 8:
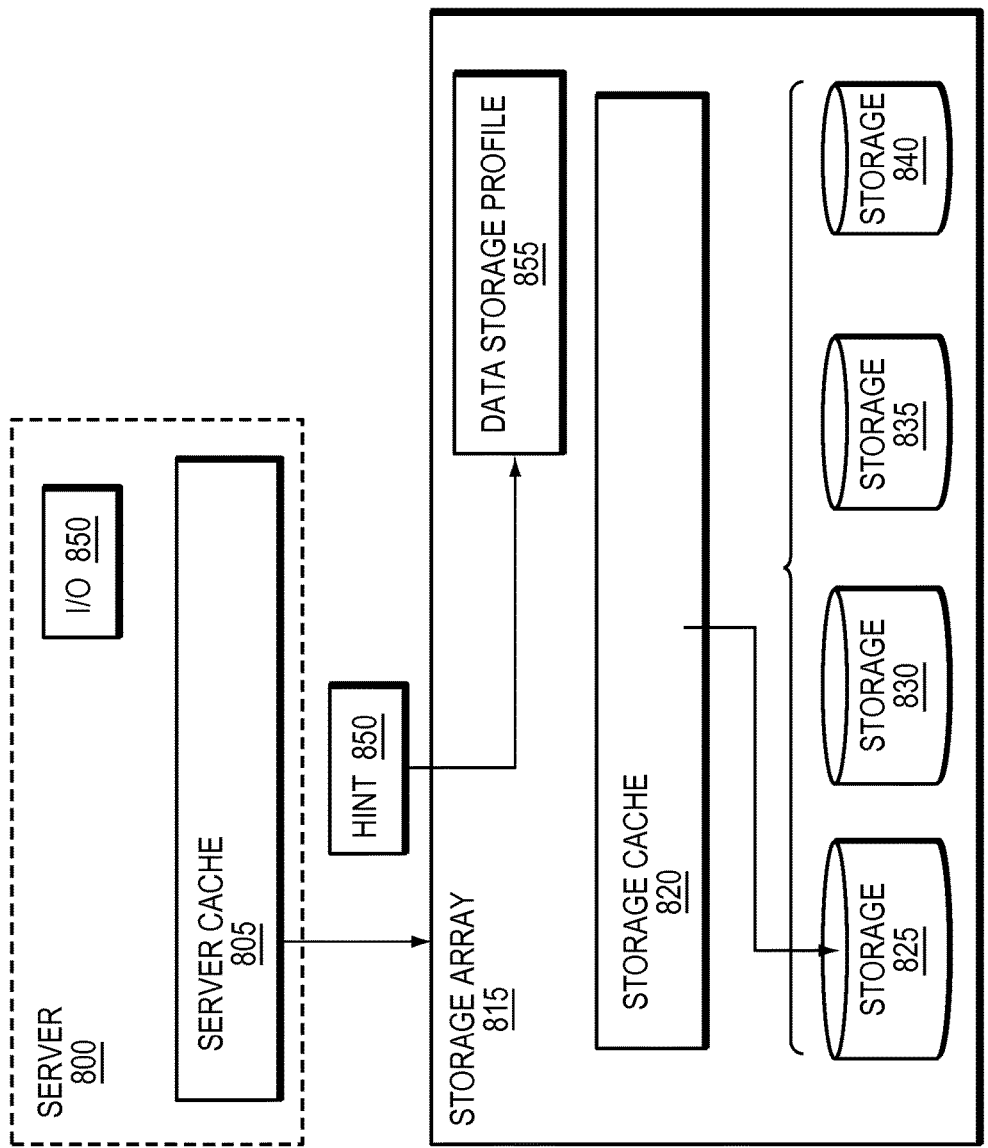
FIG. 8 is a simplified illustration of a server sending a hint to a data storage system, where the hint includes data about moving information from a storage cache of the data storage system into a slow tier of storage, in accordance with an embodiment of the present disclosure.

Refer now to the example embodiment of FIGS. 7 and 8. Storage array 815 receives hint 850 (step 700). Storage array 815 acts on hint 850 (step 705). In the embodiments of FIGS. 6 and 7, storage array may combine the information in hint 850 with data storage profile 855 to decide to move data from storage array cache 820 to storage tier 825. In these embodiments, this occurs as hint 850 indicated that server 800 is storing the information moved to storage 825 in server cache 805. In these embodiments, the requests for this data will be served by server cache 805 and the data may be safely moved to storage 825 without impacting data access performance.

Figure 9:
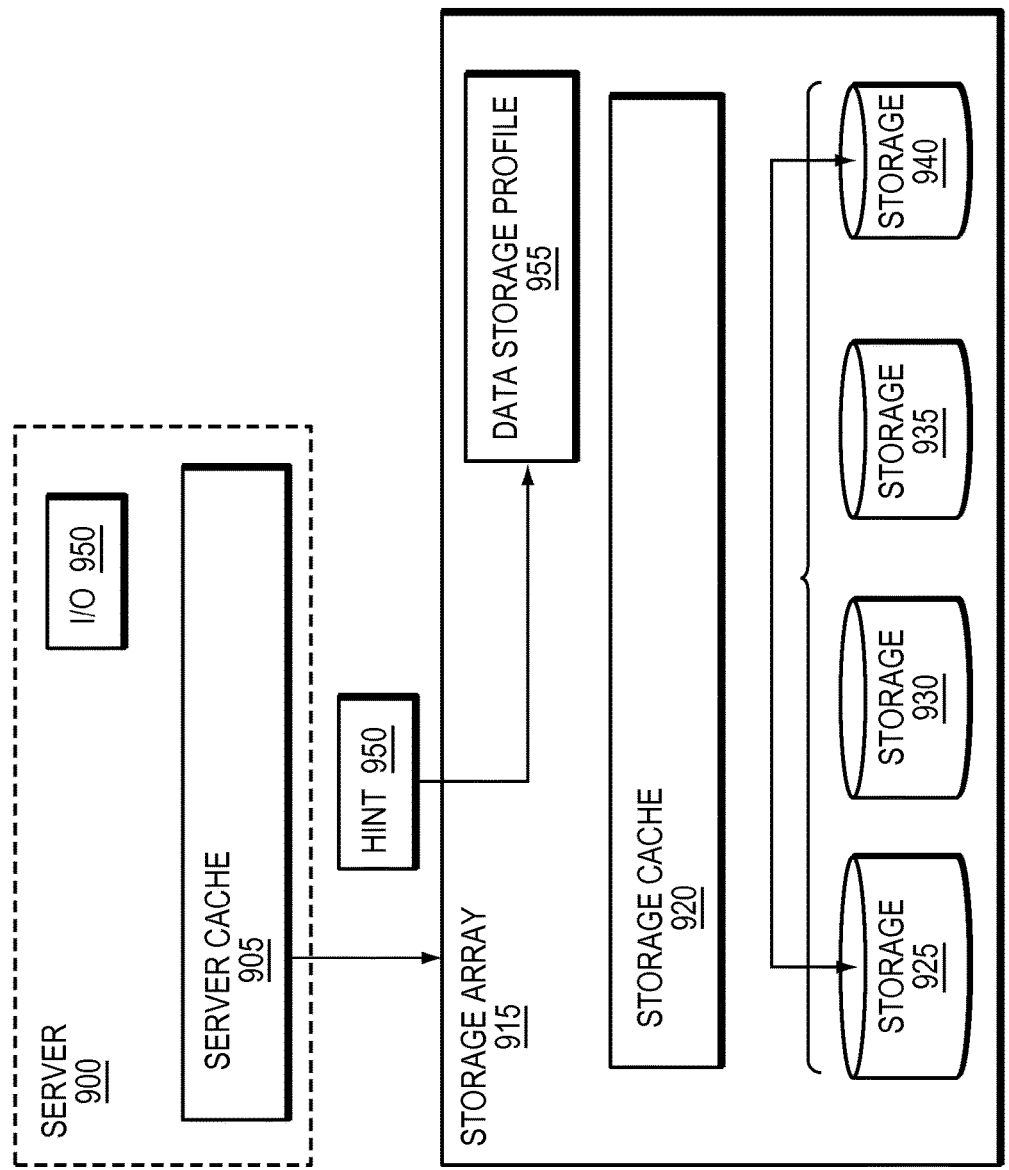
FIG. 9 is a simplified illustration of a server sending a hint to a data storage system, where the hint includes data about moving information from a slow tier of storage into a fast tier of storage, in accordance with an embodiment of the present disclosure.

Refer now to the example embodiment of FIGS. 7 and 9. Storage array 915 receives hint 950 (step 700). Storage array 915 acts on hint 950 (step 705). In these example embodiments, hint 950 provided storage array 915 with information to heat data stored on storage 925. This caused storage array to move the data from storage 925 to storage 940. Storage 940, in this example, has a faster storage profile than storage 925. In other embodiments, hint 950 may contain data indicating the data on storage 940 should be heated to ensure that the data is kept on storage tier 940 and not demoted to a lower tier storage as cold data or less accessed data. In still further embodiments, a hint may indicate a future data requests to data on the storage array and may enable the storage array to move data to facilitate access based on the future requests.

Figure 10:
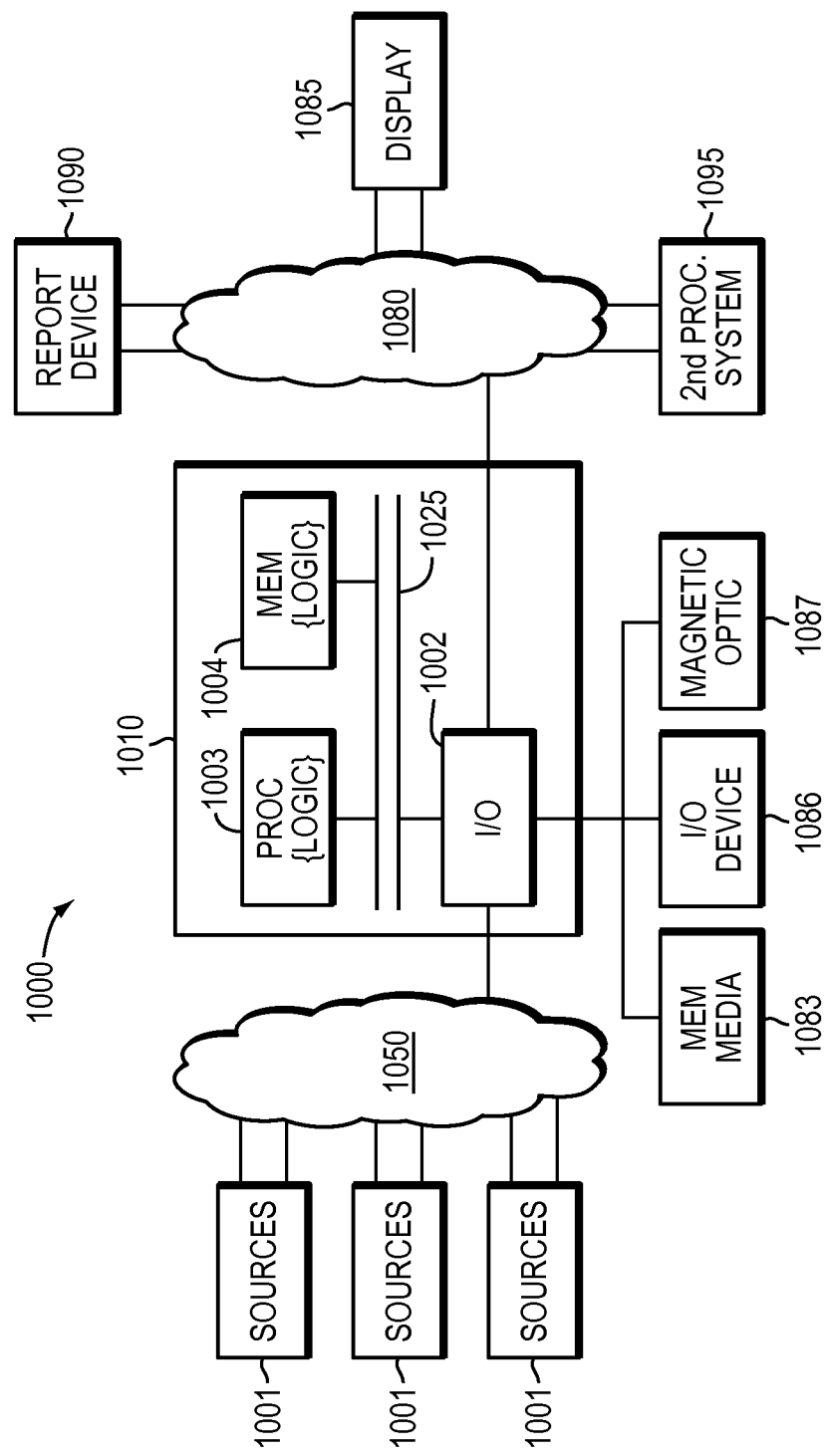
FIG. 10 is an example of an embodiment of an apparatus that may utilize the techniques described herein, in accordance with an embodiment of the present disclosure.
Figure 11:
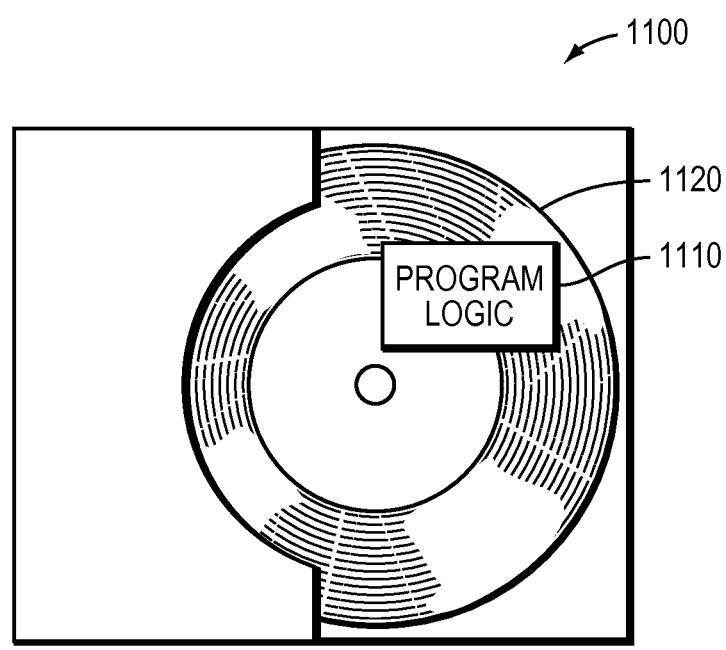
FIG. 11 is an example of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 10, the machine becomes an apparatus for practicing the invention. When implemented on one or more general-purpose processors, the program code combines with such a processor 1003 to provide a unique apparatus that operates analogously to specific logic circuits. As such a general purpose digital machine can be transformed into a special purpose digital machine. FIG. 11 shows Program Logic 1134 embodied on a computer-readable medium 1130 as shown, and wherein the Logic is encoded in computer-executable code configured for carrying out the reservation service process of this invention and thereby forming a Computer Program Product 1100. The logic 1134 may be the same logic 1040 on memory 1004 loaded on processor 1003. The program logic may also be embodied in software modules, as modules, or as hardware modules. The processors or machines may be embodied as one or more virtual processors or machines, respectively.

The logic for carrying out the method may be embodied as part of the system described below, which is useful for carrying out a method described with reference to embodiments shown in, for example, FIG. 5 and FIG. 7. For purposes of illustrating the present invention, the invention is described as embodied in a specific configuration and using special logical arrangements, but one skilled in the art will appreciate that the device is not limited to the specific configuration but rather only by the claims included with this specification.

What is claimed is:

1. A system comprising:
   a server having a cache;
   a storage array, the storage array having a plurality of storage mediums and a storage cache and storing data; and
   computer-executable logic operating in memory, wherein the computer-executable program logic is configured to enable one or more processors to execute:
   sending a hint from the server to the storage array; wherein the hint relates access requests of data stored on the storage array;
   receiving the hint at the storage array;
   updating information about the data stored on the storage array using the hint;
   wherein the hint enables preposition of the data in the array for future workload not seen by the system; and
   combining the information in the hint with information generated at the storage array to enable the storage to move stored data based on the access profile of the server and the storage array.

2. The system of claim 1 wherein the hint tells the storage array to move data from the storage cache to a slow storage medium of the plurality of storage mediums.

3. The system of claim 1 wherein the hint tells the storage array to move data from a slow storage medium to the storage cache.

4. The system of claim 1 wherein the hint tells the storage array to move data from a slow storage medium of the plurality of storage mediums to a fast storage medium.

5. A computer program product for use in ensuring consistency comprising:
   a non-transitory computer readable medium encoded with computer executable program code, the code configured to enable the execution of:
   sending a hint from a server to a storage array; wherein the hint relates access requests of data stored on the storage array;

receiving the hint at the storage array;

updating information about the data stored on the storage array using the hint;

wherein the hint is enables preposition of the data in the array for future workload not seen by the system; and combining the information in the hint with information generated at the storage array to enable the storage to move stored data based on the access profile of the server and the storage array.

6. The computer program product of claim 5 wherein the hint tells the storage array to move data from the storage cache to a slow storage medium of the plurality of storage mediums.

7. The computer program product of claim 5 wherein the hint tells the storage array to move data from a slow storage medium to the storage cache.

8. The computer program product of claim 5 wherein the hint tells the storage array to move data from a slow storage medium of the plurality of storage mediums to a fast storage medium.

9. A computer-implemented method comprising:

sending a hint from a server to a storage array; wherein the hint relates access requests of data stored on the storage array;

receiving the hint at the storage array;

updating information about the data stored on the storage array using the hint;

wherein the hint enables preposition of the data in the array for future workload not seen by the system; and combining the information in the hint with information generated at the storage array to enable the storage to move stored data based on the access profile of the server and the storage array.

10. The computer-implemented method of claim 9 wherein the hint tells the storage array to move data from the storage cache to a slow storage medium of the plurality of storage mediums.

11. The computer-implemented of claim 9 wherein the hint tells the storage array to move data from a slow storage medium to the storage cache.

12. The computer-implemented of claim 9 wherein the hint tells the storage array to move data from a slow storage medium of the plurality of storage mediums to a fast storage medium.

13. The computer implemented method of claim 9 wherein the hint contains information about storage requests serviced by a cache on a server.

14. The computer implemented method of claim 9 wherein the hint contains information that the server is going to remove data from a server cache.

15. The computer program product of claim 5 wherein the hint contains information about storage requests serviced by a cache on a server.

16. The computer program product of claim 5 wherein the hint contains information that the server is going to remove data from a server cache.

17. The system of claim 1 wherein the hint contains information about storage requests serviced by a cache on a server.

* * * * *